J. W. SCHNEIDER.
EDGE TRIMMER AND BURNISHER FOR SHOE SOLES.
APPLICATION FILED FEB. 19, 1912.
1,042,607.
Patented Oct. 29, 1912.
2 SHEETS—SHEET 1.
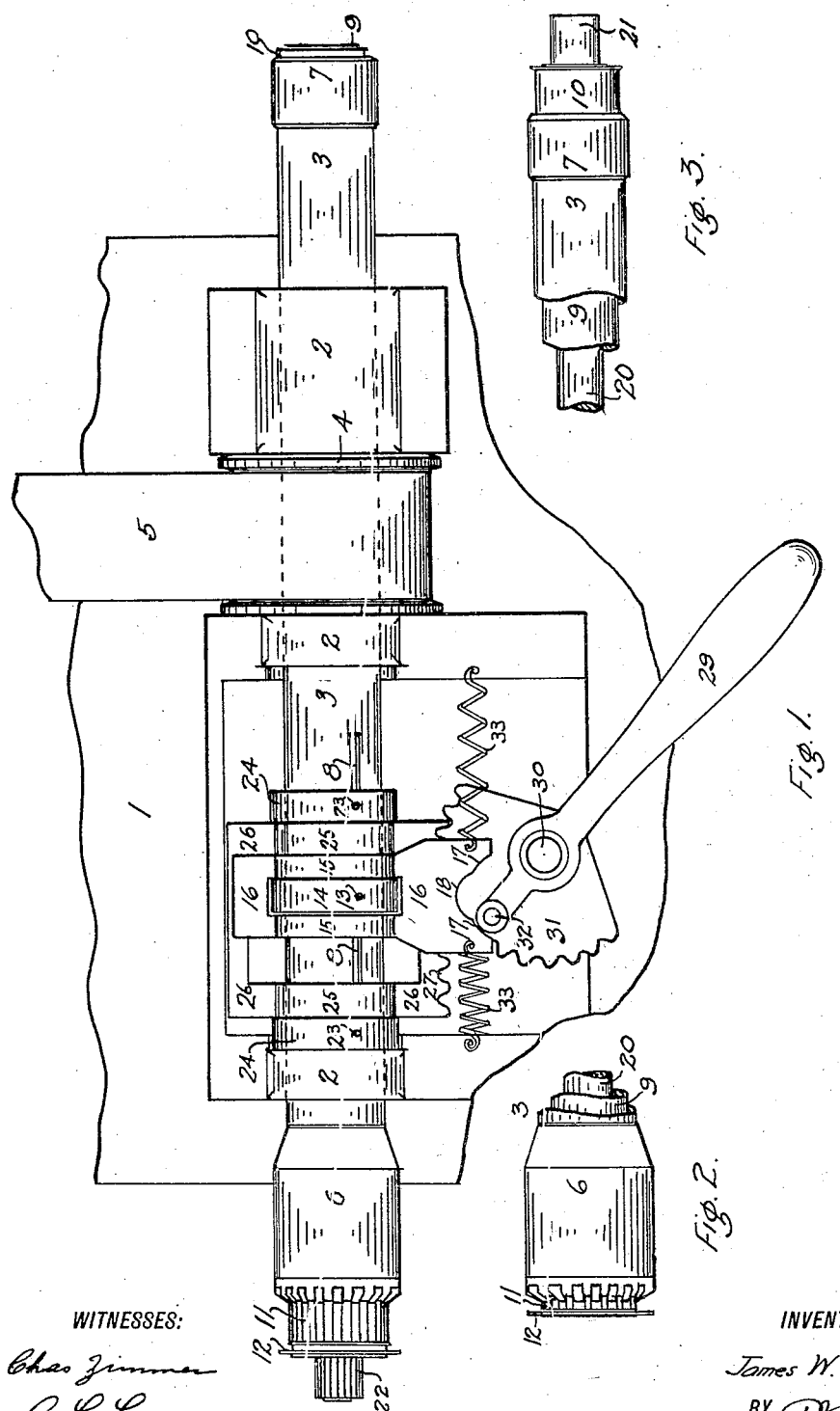
WITNESSES:
INVENTOR
James W. Schneider
BY
ATTORNEY

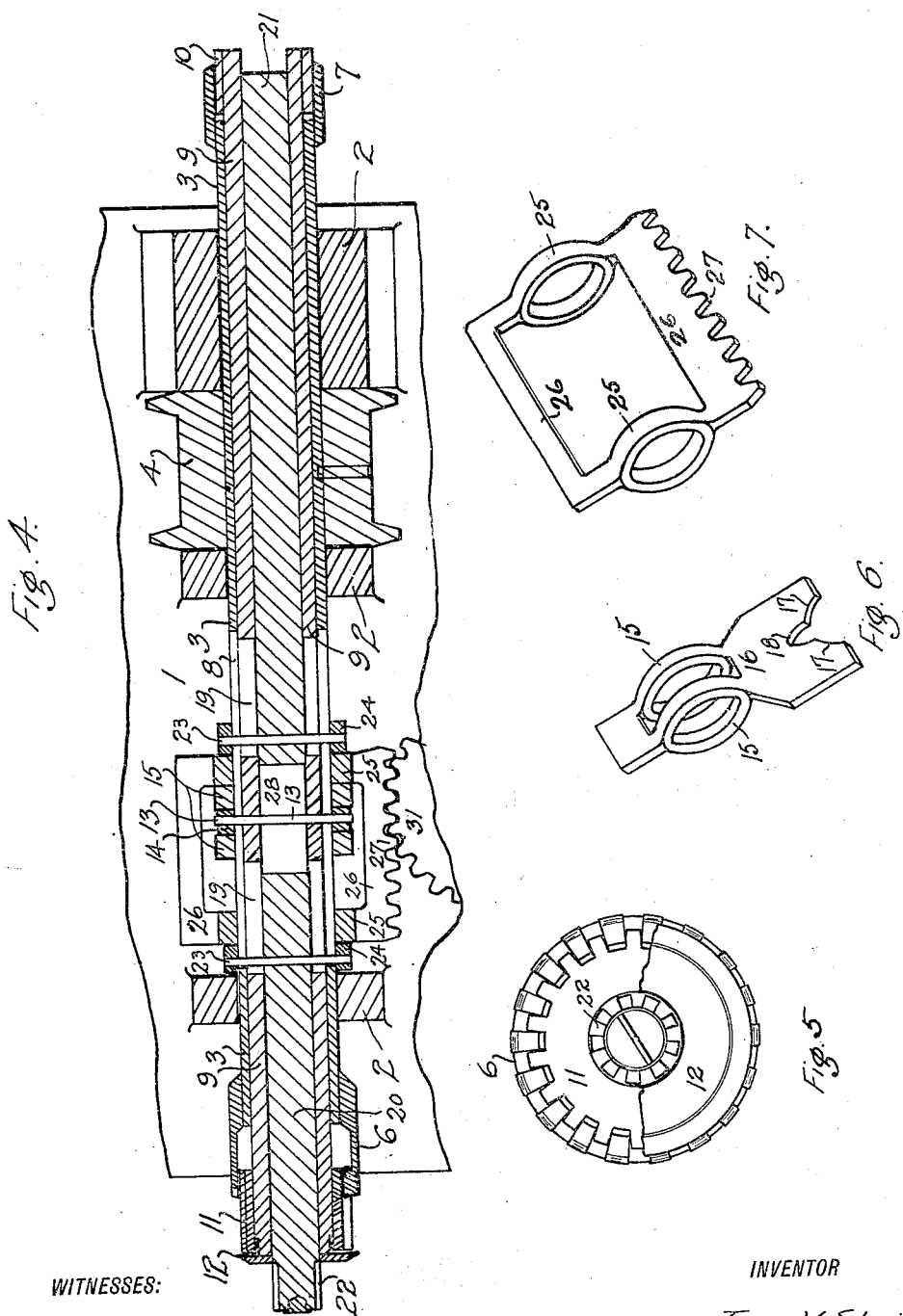

UNITED STATES PATENT OFFICE.

JAMES W. SCHNEIDER, OF TACOMA, WASHINGTON.

EDGE TRIMMER AND BURNISHER FOR SHOE-SOLES.

1,042,607.

Specification of Letters Patent.  Patented Oct. 29, 1912.

Application filed February 19, 1912. Serial No. 678,613.

*To all whom it may concern:*

Be it known that I, JAMES W. SCHNEIDER, a citizen of the United States, residing at Tacoma, in the county of Pierce and State of Washington, have invented a new and useful Edge Trimmer and Burnisher for Shoe-Soles, of which the following is a specification.

This invention relates to machines used in making or repairing shoes and especially to machines for trimming and burnishing the edges of shoe soles, and has for its object to provide a machine which will be readily adjusted while the machine is in motion for any thickness of the sole leather. I attain this and other objects by the devices, mechanism, and arrangements illustrated in the accompanying drawings, in which—

Figure 1 is a plan of the machine, the cover thereof having been removed to reveal the interior, and showing the burnisher withdrawn and the trimmer extended for use; Fig. 2 is a similar view of the trimmer end of the machine in its withdrawn position, and Fig. 3 shows the burnisher end in its extended position; Fig. 4 is a horizontal longitudinal section of the machine with the parts in the same position as shown in Fig. 1; Fig. 5 is an end elevation of the trimmer end of the machine; and Figs. 6 and 7 are perspective views of the shifting collars of the outer and inner tool shafts respectively.

Similar numerals of reference refer to similar parts throughout the several views.

This machine is provided with a suitable standard on which the base plate or frame 1 is mounted, said frame being provided with a series of suitable bearings 2, all said bearings being coaxial. A hollow shaft, or carrier, 3 is mounted in said bearings to turn therein and is provided with a suitable pulley 4, driven by the belt 5, in the usual manner. The carrier 3 is provided with cups or enlargements 6 and 7 at its ends, adapted to receive the trimming tool and the burnishing tool respectively when they are withdrawn from operating position. The carrier 3 is slotted, as at 8, said slot extending diametrically entirely through the carrier and being parallel with the axis thereof. The pulley 4 is mounted between two of the bearings 2 so that the carrier cannot move axially in the bearings.

Within the rotating carrier 3 is mounted a hollow tool shaft 9, which is free to move axially within the carrier 3 but which rotates therewith. This tool shaft 9 is slightly longer than the carrier 3 and carries a burnishing surface 10 at one end and a trimming tool 11 at the other end, with a rotating guard 12 immediately outside of said trimming tool 11.

The trimming tool consists of a number of teeth arranged around its cylindrical surface parallel with its axis, which teeth intermesh with the inclined edge-teeth on the end of the cup 6. The outer end of the burnishing tool is slightly upset as shown. The tool shaft 9 is rotated by the carrier 3 through the sliding connection effected by the pin 13 which passes through the shaft 9 and slides in the slots 8 of the carrier and which is secured in a loose collar 14 surrounding the carrier 3. This collar 14 rotates with the carrier 3 but is free to slide axially thereon and to carry the tool shaft 9 therewith, but its axial motion is controlled by the bifurcated collar 15, one portion thereof being on each side of the rotating collar 14. This collar 15 does not rotate but is formed in one piece with the casting 16 which is slightly above the axis of the collar, said casting being provided with a compound notch in its edge. The outer portions 17 of this notch are similar and are formed of two parts of a circular arc each part having as center the center of the pivot of the actuating lever when the said casting 16 and collar 15 has been shifted to the two extreme positions, and the center part 18 of the notch, between the two parts 17, is curved and is deep enough for the said actuating lever to engage it when it is in intermediate position. The tool shaft 9 is also provided with two slots 19 passing diametrically through it, one slot being on each side of the portion through which the pin 13 passes.

The central tool shaft 20 is mounted within the hollow tool shaft 9 and rotates therewith but has an additional axial motion relatively thereto. This tool shaft 20 carries a small burnishing surface 21 at one end and a small trimming surface 22 at the other end. This shaft 20 is very slightly longer than the shaft 9. The shaft 20 is rotated by the carrier 3 by means of two pins 23 which are secured in the shaft 20 but which pass freely through both the slots 19 and 8 and are secured in the two loose collars 24 surrounding the carrier 3. These collars 24 rotate with the carrier 3 but are free to slide axially thereon and to carry the inner tool shaft 20 therewith, but their axial motion is controlled by means of the shifting mechanism comprising the two collars 25 formed on a single casting 26 and each adapted to engage the inner sides of the loose collars 24. The casting 26 has a rack of teeth 27 slightly below the axis of the collars 25. The casting 26 slides on the base plate or frame 1 and does not rotate. The shaft 20 has a slot 28 therethrough through which the pin 13, above described, freely passes. Thus it will be seen that both of the tool shafts 9 and 20 rotate with the carrier 3 and that each of them has an independent axial motion therein.

The operating lever comprises a handle 29 acting in a horizontal plane about a pivot 30 and having a toothed sector 31 engaging and operating the rack 27 and a roller or lug 32 engaging the part 18 of the notch in the casting 16 to move the casting from its mean position but engaging the parts 17 of the notch to hold the casting in its extreme positions. Springs 33 are secured to the frame and to the casting 16 to resist its displacement from its central position.

The operation of my machine is briefly as follows:—The belt 5 rotates the carrier 3 through the pulley 4, and the carrier rotates both of the tool shafts 9 and 20 through the pins 13 and 23. If the sole is of thick leather then, to trim its edge, I turn the handle 29 to the right until the trimming surface 11 extends sufficiently from the cup 6 on the left-hand end of the machine to fit the leather and so that the guard 12 engages its edge; but if the form of the shoe will not allow the use of the guard then I turn the handle 29 farther to the right so that the tool surface 22 extends beyond the surface 11, said surface 22 having no guard on its outer face; then, to burnish the surface, the handle is correspondingly shifted toward the left and the corresponding burnishing tools 10 and 21 extend out from the cup 7 on the right-hand end of the machine.

Having described my invention, what I claim is:—

1. In a shoe-sole-edge finishing machine, the combination with a frame; of a rotating carrier mounted therein, and having a tool-cup at one end thereof; a tool-shaft rotated by said carrier and axially movable relatively thereto, and carrying a tool on the end thereof adapted to extend outward from the cup in said carrier; and means for axially shifting said tool-shaft whereby the extent that the tool projects from the cup is adjusted.

2. In a shoe-sole-edge finishing machine, the combination with a frame; of a rotating carrier mounted therein, and having a tool-cup at one end thereof; a hollow tool-shaft rotated by said carrier and axially movable relatively thereto, and carrying a tool in the end thereof adapted to extend outward from the cup in said carrier; a central tool-shaft mounted within said hollow tool-shaft and rotating therewith but axially movable relatively thereto and carrying a tool at the end thereof adapted to extend outward from the end of said tool on said hollow shaft or to be withdrawn thereinto; and means engaging both of said tool shafts and acting thereon whereby the extent that the tool on the hollow tool-shaft projects beyond the cup, and the extent that the tool in the central shaft projects beyond the first tool, may be adjusted.

3. In a shoe-sole-edge finishing machine, the combination with a frame; of a rotating carrier mounted therein and comprising a hollow shaft with a longitudinal slot therethrough and a tool-cup at one end thereof; a tool-shaft mounted within said carrier; a pin secured in said tool-shaft and passing through the slot in the carrier whereby the tool-shaft is rotated by the carrier but is axially movable relatively thereto; a tool mounted on the end of said tool-shaft and adapted to extend outward from the tool-cup on the carrier; a collar loosely mounted on said carrier and secured to said pin; an axially movable, nonrotative, collar on each side of said loose collar whereby said loose collar may be shifted on said carrier; and a pivoted lever mounted on the frame and engaging said nonrotative collar to move it axially whereby the extent that the tool projects from the cup is adjusted.

JAMES W. SCHNEIDER.

Witnesses:
M. F. McNiel,
H. A. Eastman.